(12) United States Patent
Liljedahl

(10) Patent No.: US 10,353,629 B2
(45) Date of Patent: Jul. 16, 2019

(54) HANDLING IN-ORDER AND OUT-OF-ORDER RING BUFFER UPDATES

(71) Applicant: ARM Limited, Cambridge (GB)

(72) Inventor: Eric Ola Harald Liljedahl, Lund (SE)

(73) Assignee: ARM Limited, Cambridge (GB)

( * ) Notice: Subject to any disclaimer, the term of this patent is extended or adjusted under 35 U.S.C. 154(b) by 109 days.

(21) Appl. No.: 15/708,494

(22) Filed: Sep. 19, 2017

(65) Prior Publication Data

US 2019/0087123 A1    Mar. 21, 2019

(51) Int. Cl.
  *G06F 3/06* (2006.01)
(52) U.S. Cl.
  CPC .......... *G06F 3/0659* (2013.01); *G06F 3/0611* (2013.01); *G06F 3/0656* (2013.01); *G06F 3/0673* (2013.01)
(58) Field of Classification Search
  CPC .... G06F 3/0659; G06F 3/0611; G06F 3/0673; G06F 3/0656
  USPC .......................................................... 711/110
  See application file for complete search history.

(56) References Cited

U.S. PATENT DOCUMENTS

| 9,047,243 B2 * | 6/2015 | Taylor | G06F 15/167 |
| 9,697,136 B2 * | 7/2017 | Saidi | G06F 12/1027 |
| 2016/0342545 A1 * | 11/2016 | Arai | G06F 12/0868 |

* cited by examiner

*Primary Examiner* — Pierre Miche Bataille
(74) *Attorney, Agent, or Firm* — Nixon & Vanderhye P.C.

(57) ABSTRACT

Techniques are provided in which a ring buffer comprises multiple slots for a queued sequence of data items. New data items are sequentially added to the queued sequence and sequentially removed for further processing. A base record comprises a reference indicator, wherein a value of the reference indicator is indicative of a current slot of the multiple slots of the ring buffer. A pending update record is provided comprising a subject slot indicator, an update slot indicator, and a next update pointer for pointing to another pending update record. The base record further comprises a pending update record pointer. When there is an update to be applied to the value of the reference indicator of the base record, but the update is out-of-order, i.e. references a different slot to the current slot, a new pending update record is generated indicative of the update. Techniques for allocating and releasing elements in an array shared by multiple threads are also disclosed.

24 Claims, 12 Drawing Sheets

HANDLING IN-ORDER AND OUT-OF-ORDER RING BUFFER UPDATES

TECHNICAL FIELD

The present disclosure relates to data processing. More particularly it relates to the administration of a ring buffer in a data processing apparatus.

BACKGROUND

Various data processing contexts may generate data items to be further processed in a specific order and one mechanism by which this may be administered is to hold those generated data items in a queued sequence in a ring buffer, wherein newly generated data items are added to the tail end of the queued sequence, whilst data items are removed from the head end of the queued sequence for the further processing. This queued sequence of data items held in the ring buffer can provide a centralised store of generated data items which require further processing, to which multiple "producers" operating in the data processing system may add generated data items and from which multiple "consumers" in the data processing system may remove data items for further processing. However, this interaction of multiple producers and consumers with the ring buffer can mean that the action of one producer or consumer with respect to the content of the ring buffer can block other producers or consumers from carrying out their own interactions with the ring buffer. In a lock-based approach only one producer or consumer can access the ring buffer at a time and this can thus become a significant bottleneck in throughput. Moreover, even in "lock-less" ring buffer designs one producer or consumer can still block other producers or consumers from completing due to the constraint that they must release their updates to the ring buffer in order of ring buffer acquisition (i.e. in the order of the queued sequence of data items) in order to preserve the correct ordering of the ring buffer and of the updates that are made to it. If an earlier producer or consumer is stalled (for example in an interaction with another system component, e.g. a cache miss), then later producers or consumers must wait until the earlier producer or consumer completes. This creates both non-determinism (latencies and stalls in one thread may propagate to other threads) and also creates scalability problems (since the multiple threads are effectively passing a symbolic token between them in order to complete, and this creates a serialisation of all involved threads).

SUMMARY

In one example embodiment there is an apparatus comprising: ring buffer storage circuitry for storage of a ring buffer comprising multiple slots for a queued sequence of data items; data processing circuitry to sequentially add data items to be processed to the queued sequence and to sequentially remove data items for processing from the queued sequence; base record storage for storage of a base record comprising a reference indicator, wherein a value of the reference indicator is indicative of a current slot of the multiple slots of the ring buffer; and pending update record storage for storage of at least one pending update record, wherein a pending update record comprises: a subject slot indicator, an update slot indicator, and a next update pointer item for storage of a pointer to another pending update record, wherein the base record further comprises a next record pointer item for storage of a pending update record pointer, and wherein, when a currently active process in the data processing circuitry has an update to be applied to the value of the reference indicator of the base record, the currently active process in the data processing circuitry is responsive to an out-of-order condition, in which the update references a different slot to the current slot, to generate a new pending update record indicative of the update.

In another example embodiment there is a method of operating data processing apparatus comprising the steps of: allocating storage for a ring buffer comprising multiple slots for a queued sequence of data items; sequentially adding data items to be processed to the queued sequence and sequentially removing data items for processing from the queued sequence; storing a base record comprising a reference indicator, wherein a value of the reference indicator is indicative of a current slot of the multiple slots of the ring buffer; storing at least one pending update record, wherein a pending update record comprises: a subject slot indicator, an update slot indicator, and a next update pointer item for storage of a pointer to another pending update record, wherein the base record further comprises a next record pointer item for storage of a pending update record pointer; and when a currently active process in the data processing apparatus has an update to be applied to the value of the reference indicator of the base record, the currently active process in the data processing apparatus is responsive to an out-of-order condition, in which the update references a different slot to the current slot, to generate a new pending update record indicative of the update.

In another example embodiment there is an apparatus comprising: data storage circuitry to store a data structure comprising multiple elements; data processing circuitry to host execution of multiple processes to perform data processing operations on data items stored in the multiple elements of the data structure; shared free word storage to store a shared free word comprising multiple bits corresponding to the multiple elements of the data structure, wherein multiple processes executing in the data processing circuitry are permitted to modify the shared free word; and private free word storage to store a private free word comprising multiple bits corresponding to the multiple elements of the data structure, wherein only a selected process executing in the data processing circuitry is permitted to modify the private free word, wherein each of the multiple processes executing in the data processing circuitry, when freeing an element of the data structure, sets a selected bit of the shared free word to indicate that a corresponding storage location of the freed element of the structure is now free, wherein the selected process executing in the data processing circuitry, when a selected storage location is allocated for an element of the data structure, clears a selected bit of the shared free word to indicate that the selected storage location is in use, and wherein the selected process executing in the data processing circuitry is responsive to all bits of the private free word being unset to copy the shared free word to replace the private free word and then clears all bits of the shared free word.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
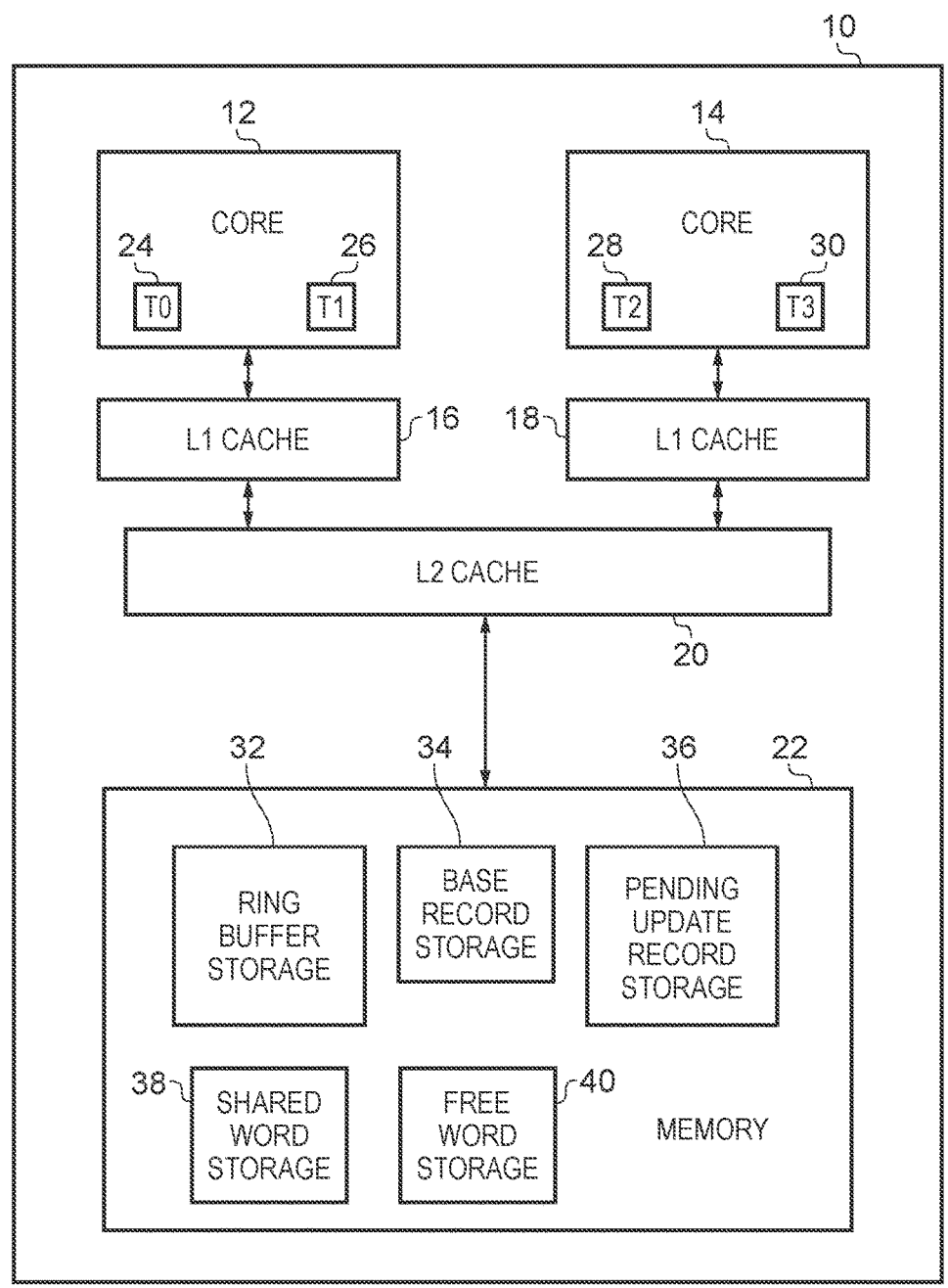
FIG. 1 schematically illustrates a data processing apparatus in one embodiment.

At least some embodiments provide an apparatus comprising: ring buffer storage circuitry for storage of a ring buffer comprising multiple slots for a queued sequence of data items; data processing circuitry to sequentially add data items to be processed to the queued sequence and to sequentially remove data items for processing from the queued sequence; base record storage for storage of a base record comprising a reference indicator, wherein a value of the reference indicator is indicative of a current slot of the multiple slots of the ring buffer; and pending update record storage for storage of at least one pending update record, wherein a pending update record comprises: a subject slot indicator, an update slot indicator, and a next update pointer item for storage of a pointer to another pending update record, wherein the base record further comprises a next record pointer item for storage of a pending update record pointer, and wherein, when a currently active process in the data processing circuitry has an update to be applied to the value of the reference indicator of the base record, the currently active process in the data processing circuitry is responsive to an out-of-order condition, in which the update references a different slot to the current slot, to generate a new pending update record indicative of the update.

The present techniques recognise that in a data processing system using a ring buffer as a queued sequence in which multiple independent actors (e.g. threads) add data items for processing to the queued sequence (i.e. are "producers") and remove data items for processing from the queued sequence (i.e. are "consumers"), that unless these actors only operate in a strictly in-order manner with respect to the order in which the sequence of data items must be processed (which would cause significant scalability problems if seeking to allow more and more actors to interact with the ring buffer) that in order to allow scalability the actors need to be able to release their updates out-of-order. The present techniques make use of "delegation" to break the dependency chain and to allow the actors to release their updates in this out-of-order manner. To do this, the present techniques provide both a base record which contains a reference to a current slot of the multiple slots of the ring buffer (and may therefore for example be used as a head pointer or a tail pointer for the queued sequence of data items), and also one or more pending update records in each of which an out-of-order update released by an actor (typically a thread executing in the data processing circuitry of the apparatus), such that this actor can return to its own other data processing activities without stalling by waiting until its update became in-order before it could continue. The base record not only provides an indication of the current slot of the multiple slots in the ring buffer, but also comprises a pointer which can be configured to point to a pending update record. Moreover, the pending update records themselves each comprise a pointer item which can be configured to point to another pending update record. In this manner the base record may point to a pending update record, whilst any given pending update record may point to another pending update record. A linked list of pending update records can thus be generated, allowing any number of pending out-of-order updates to be recorded such that when they become in-order they may be correctly processed to update the value of the reference indicator of the base record. Thus, for each out-of-order update, a new pending update record indicative of the update is generated.

When an actor in the system (e.g. a thread) wishes to release an update out-of-order, as mentioned above a new pending update record indicative of this update is generated. This pending update record then needs to be linked either directly or indirectly to the base record, such that a later actor (e.g. another thread) can take responsibility for implementing this update once it becomes in-order. When this new pending update record is generated the base record may not in fact point to a valid pending update record. This is for example the case when there are no pending out-of-order updates and the base record is in effect a simple scalar value indicative of the current slot in the ring buffer. Hence, in this situation, in some embodiments, the currently active process in the data processing circuitry is further responsive to the out-of-order condition, when the next record pointer item of the base record does not point to a valid pending update record, to update the next record pointer item of the base record to point to the new pending update record.

The particular content of the next record pointer item of the base record could take a variety of forms when it does not point to a valid pending update record, but in some embodiments the currently active process in the data processing circuitry is further responsive to the out-of-order condition, when the next record pointer item of the base record comprises a null pointer, to update the next record pointer item of the base record to point to the new pending update record.

On the other hand, when a new pending update record is generated there may already be one or more valid pending update records stored, i.e. representing one or more out-of-order updates which have been released by the actors which generated them. In some embodiments therefore the currently active process in the data processing circuitry is further responsive to the out-of-order condition, when the next record pointer item of the base record points to a valid pending update record currently stored in the pending update record storage, to form a linked list of pending update records using the valid pending update record and the new pending update record. The formation of a linked list of pending update record thus groups the out-of-order updates together into a single (albeit extensible) ordered structure to which the base record can point.

The formation of the linked list of pending update records may take a variety of forms. To outline three possibilities the new pending update record may be inserted between the base record and the existing pending update record ("the valid pending update record"), at an intermediate point in a pre-existing linked list of pending update records, or it may be appended after the existed pending update record to thus form the tail end of the linked list.

Accordingly in some embodiments, the currently active process in the data processing circuitry is further responsive to the out-of-order condition, when the next record pointer item of the base record points to a valid pending update record currently stored in the pending update record storage, to form a linked list of pending update records using the valid pending update record and the new pending update record.

Accordingly in some embodiments forming the linked list of pending update records using the valid pending update record and the new pending update record comprises modifying the next record pointer item of the base record to point to the new pending update record and setting the next update pointer item of the new pending update record to point to the valid pending update record.

Accordingly in some embodiments forming the linked list of pending update records using the valid pending update record and the new pending update record comprises modifying the next record pointer item of the valid pending update record to point to the new pending update record.

Accordingly in some embodiments forming the linked list of pending update records using the valid pending update record and the new pending update record comprises modifying an existing linked list of pending update records which comprises the valid pending update record to further comprise the new pending update record.

The present techniques further recognise that, when the base record points to at least one pending update record, when the base record is updated by the next in-order update which is applied to it this may present the opportunity for at least one out-of-order update (recorded as one of the pending update records) to also be completed, because the updating of the base record has now meant that this pending update record has become the next in-order update. However, the present techniques further recognise in this regard that an actor (e.g. thread) performing the in-order update of the base record could have to traverse a possibly quite long linked list of pending updates to establish if one of them is indeed the next in-order update. Indeed, in the context of multiple actors interacting with the ring buffer and the desire to provide techniques with scalability, the longer the linked list of pending updates becomes, the more of a processing burden this traversal also becomes. To ameliorate this the present techniques, in some embodiments, provide that the base record further comprises an earliest slot indicator item for storage of a value indicating an earliest subject slot indicator value in any valid pending update record currently stored in the pending update record storage. The provision of this earliest slot indicator item therefore means that an actor updating the base record can directly establish, from the base record itself, if the next in-order update is available in an update record to which the base record points (either directly or via several steps through a linked list of pending updates). Importantly, if the next in-order update is not already present, then the traversal of the linked list can be avoided and thus the processing associated therewith saved.

As mentioned above, if an actor in the system wishes to release an update to the reference indicator of the base record which can immediately be implemented, i.e. wherein the update applies to the current slot indicated by the base record, this is in fact the definition of the update being the in-order update. Accordingly, in some embodiments when the currently active process in the data processing circuitry has the update to be applied to the value of the reference indicator of the base record, the currently active process in the data processing circuitry is responsive to an in-order condition, in which the update references the current slot, to apply the update to the value of the reference indicator of the base record.

After having applied its own update to the base record the currently active process may then continue to process at least one pending update record (as pointed to directly to or indirectly to by the next record pointer item of the base record), this for example either occurring because the above mentioned earliest slot indicator item has shown that the next in-order update has already been released and stored as a pending update record or because (in embodiments without such an earliest slot indicator item) the currently active process has followed the next record pointer of the base record to determine if the next in-order update is already stored as a pending update. Accordingly in some embodiments, when the currently active process in the data processing circuitry has the update to be applied to the value of the reference indicator of the base record, the currently active process in the data processing circuitry is responsive to an in-order condition, in which the update references the current slot, to apply the update to the value of the reference indicator of the base record.

Thus, if a further, now in-order, pending update record is found in this manner then it can (and indeed should) be processed by the currently active process in order to update the value of the reference indicator of the base record. This thus provides one mechanism by which the delegation of carrying out an out-of-order update is passed to another actor (process, e.g. thread) in the system. Hence, in some embodiments the currently active process in the data processing circuitry is further responsive to the in-order condition to process at least one pending update record to which the next update pointer item leads, and, when the in-order condition is found again (i.e. the subject slot indicator of one of the at least one pending update records indicates the current slot after the update), to apply the update of said one of the at least one pending update records to the value of the reference indicator of the base record. As mentioned above the base record may comprise an earliest slot indicator item, and in this situation the currently active process can determine, after updating the value of the reference indicator of the base record with its own update, that the next in-order update is certainly to be found by following the pending update record pointer of the base record, and can then follow that pointer to find the next in-order pending update and also apply it. Accordingly in some embodiments when the currently active process in the data processing circuitry has the update to be applied to the value of the reference indicator of the base record, the currently active process in the data processing circuitry is responsive to an in-order condition, in which the update references the current slot, to apply the update to the value of the reference indicator of the base record, and to determine if an available further update condition is met in which the earliest subject slot indicator value in the earliest slot indicator item is a next sequential slot after the current slot, and when the available further update condition is met to process at least one valid pending update record currently stored in the pending update record storage to retrieve and apply an available further update.

Where the earliest slot indicator item is indicative of the pending update stored which is applicable to the earliest slot of all the pending updates, when a new update is to be released out-of-order by generating a new pending update record, it could be the case that that new pending update record itself now holds the position of being the pending update record applicable to the earliest slot of all the linked pending update records stored. Accordingly, in some embodiments the currently active process in the data processing circuitry is further responsive to the out-of-order condition, when the next record pointer item of the base record points to a valid pending update record currently stored in the pending update record storage, to form a linked list of pending update records using the valid pending update record and the new pending update record and to store the subject slot indicator of the new pending update record in the earliest slot indicator item when the subject slot indicator of the new pending update is now the earliest subject slot indicator value in the linked list of pending update records.

The current slot indicated by the reference indicator of the base record of the present techniques may represent a variety of functions with respect to the administration of the ring buffer. In some embodiments the base record comprises a head pointer used to indicate a first (oldest) data item in the queued sequence of data items by processes ("producers") executing in the data processing circuitry to sequentially add data items to be processed to the queued sequence. In some embodiments the base record comprises a tail pointer used to indicate a last (newest) data item in the queued sequence of data items by processes ("consumers") executing in data processing circuitry to sequentially remove items for processing from the queued sequence. In other words, the base record may be a "producer" head pointer or a "consumer" tail pointer.

The present techniques provide that access to the base record and (where appropriate) to at least one pending update record is limited to a short interaction in this "critical section" (since some degree of synchronization between the different processes accessing the base record is unavoidably required, where this is a shared data structure) and hence the present techniques recognise that the possibility exists for more than one active process to seek to release an out-of-order update at the same time. In this situation therefore the possibility arises that whilst a first active process is processing the base record and, possibly, at least one pending update record, that another active process will begin the process of reading the base record and, possibly at least one pending update record, lead to the possibility that for example by the time the first active process has concluded its processing of these records to the point at which all in-order updates have been found (even if not yet implemented) another active process may have modified those records, for example adding a further pending update record. Accordingly, to ensure that at the conclusion of the processing procedure it is truly "up to date" in some embodiments the currently active process in the data processing circuitry is responsive to a conclusion of a processing procedure on the base record and, when required, on the at least one pending update record, to determine whether a modification to the base record or, when processed, to the at least one pending update record, has been made by another active process during the processing procedure, and when the modification has occurred to repeat the processing procedure.

The present techniques further recognise that in the context of the administration of the ring buffer according to the above-described techniques, in particular where one process executing in the data processing circuitry may allocate a new pending update record, whilst another process executing in the data processing circuitry may release it, it may be beneficial to provide a technique for communication of available storage locations for pending update records between processes executing in the data processing circuitry, such that when one selected process executing in the data processing circuitry needs to allocate (acquire) a storage location for a pending update record it knows which storage locations are available for this purpose. However, this requires a degree of interaction between the processes which must be kept to a very low overhead or the performance of the main lock-free algorithm would be negatively affected. Accordingly, to support this the present techniques provide, in some embodiments, shared free word storage to store one or more shared free words comprising multiple bits corresponding to an array of pending update records, wherein multiple processes executing in the data processing circuitry are permitted to modify the one or more shared free words; and private free word storage to store a private free word comprising multiple bits, wherein only a selected process executing in the data processing circuitry is permitted to modify the private free word, wherein each of the multiple processes executing in the data processing circuitry, when freeing a completed update record, further atomically sets a selected bit of the one or more shared free words to indicate that a corresponding storage location of the completed update record is now free, wherein the selected process executing in the data processing circuitry, when seeking to allocate a new pending update record, further selects a selected storage location to allocate for the new pending update record for which a corresponding bit of the private free word is set and clears the corresponding bit to indicate that the selected storage location is now in use, and wherein the selected process executing in the data processing circuitry is responsive to all bits of the private free word being unset to atomically copy a selected shared free word of the one or more shared free words to replace the private free word and to unset all bits of the selected shared free word.

The selected process executing in the data processing circuitry which is the owner of the private free word storage (and the only process which can access it) therefore finds an available storage location for the new pending update record by examining the private free word. This may for example be done by a "find first set bit" function. This set bit is cleared to indicate that the corresponding storage location is now in use. In the event that the selected process finds that no bits of the private free word are set, then it makes reference to the one or more shared free words and atomically copies one of these to replace the private free word and clears all bits of the selected shared free word. Effectively therefore, where the other processes executing in the data processing circuitry set bits in the one more shared free words to indicate that certain storage locations are now free, the selected process transfers these available free locations to the private free word. It is to be noted that, in the event that this atomic transfer from the selected shared free word to the private free word does not in fact transfer any set bits (because none have been set by other processes), the subsequent attempt by the selected process to find a set bit in the private free word will again fail and a further transfer from the one or more shared free words will take place and eventually after storage locations have been freed by the other processes at least one bit will be set in the private free word for the selected process to use. It should be appreciated that this technique has been presented above using an example with "shared free word(s)" and a "private free word", in which bits are set to indicate available ("free") storage locations, but the same technique could equally be embodied in an example using "shared used word(s)" and a "private used word", in which bits are set to indicate unavailable ("used") storage locations. Equally even the choice of the meaning of a "set" bit will be recognised to be arbitrary, where this could be trivially inverted without changing the underlying technique.

There may be only one shared free word corresponding in size to a single array of pending update record and indeed to the size of private free word. Accordingly in such embodiments the shared free word storage stores one shared free word, the one shared free word comprising multiple bits corresponding to the array of pending update records, and wherein the selected process executing in the data processing circuitry is responsive to all bits of the private free word being unset to atomically copy the one shared free word as the selected shared free word to replace the private free word.

In some embodiments there may be more than one shared free word wherein together the multiple bits of the plural shared free words correspond to the one or more arrays of pending update records and only one shared free word is then copied to the private free word in some embodiments. Accordingly, in these embodiments the shared free word storage stores plural shared free words, the plural shared free words together comprising multiple bits corresponding to the one or more arrays of pending update records, and wherein the selected process executing in the data processing circuitry is responsive to all bits of the private free word being unset to atomically copy one of the plural shared free words as the selected shared free word to replace the private free word.

In embodiments in which there are plural shared free words the shared free words may then be an integer multiple factor longer that the private free word and in some such embodiments the plural shared free words are together an integer multiple factor longer than the private free word and the private free word storage further comprises storage for a section indicator, wherein the section indicator holds a section value of up to the integer multiple factor, and the selected process executing in the data processing circuitry is responsive to the section value to select the selected storage location to allocate for the new pending update record in a corresponding section of the pending update record storage, and the selected process executing in the data processing circuitry is responsive to the section value to select the selected shared free word corresponding to the section value. Furthermore, this section indicator may then be updated after the atomic copy from the shared free words has been carried out, for example by incrementing such that the plural shared free words are used in a round-robin manner.

In order that the process seeking to free a storage location can do so efficiently, in some embodiments a storage address of the one or more shared free words and an indication of a respective bit of the one or more shared free words corresponding to the new pending update record are also stored in the selected storage location for the new pending update record. This provides one mechanism by which from a given storage location hosting a given slot the corresponding bit location in the one or more shared free words can directly be found.

In some embodiments the one or more shared free words may be found from the storage location of the array of pending update records by virtue of the fact that they are stored in a known relationship to one another and accordingly in some embodiments the one or more shared free words is stored at a storage address with a predetermined relationship to a storage address of the array of pending update records. For example the shared free words might be stored directly adjacent in memory to the array of pending update records. From the address of the pending update record the corresponding (shared) free word and bit can then be calculated.

In some embodiments the one more shared free words and the private free word are stored in different cache lines in cache storage circuitry of the apparatus. This supports the efficient processing of the shared free words separately from the private free word such that access to one does not disrupt access to the other.

At least one example embodiment provides a method of operating data processing apparatus comprising the steps of: allocating storage for a ring buffer comprising multiple slots for a queued sequence of data items; sequentially adding data items to be processed to the queued sequence and sequentially removing data items for processing from the queued sequence; storing a base record comprising a reference indicator, wherein a value of the reference indicator is indicative of a current slot of the multiple slots of the ring buffer; storing at least one pending update record, wherein a pending update record comprises: a subject slot indicator, an update slot indicator, and a next update pointer item for storage of a pointer to another pending update record, wherein the base record further comprises a next record pointer item for storage of a pending update record pointer; and when a currently active process in the data processing apparatus has an update to be applied to the value of the reference indicator of the base record, the currently active process in the data processing apparatus is responsive to an out-of-order condition, in which the update references a different slot to the current slot, to generate a new pending update record indicative of the update.

At least one example embodiment provides an apparatus comprising: data storage circuitry to store a data structure comprising multiple elements; data processing circuitry to host execution of multiple processes to perform data processing operations on data items stored in the multiple elements of the data structure; shared free word storage to store a shared free word comprising multiple bits corresponding to the multiple elements of the data structure, wherein multiple processes executing in the data processing circuitry are permitted to modify the shared free word; and private free word storage to store a private free word comprising multiple bits corresponding to the multiple elements of the data structure, wherein only a selected process executing in the data processing circuitry is permitted to modify the private free word, wherein each of the multiple processes executing in the data processing circuitry, when freeing an element of the data structure, sets a selected bit of the shared free word to indicate that a corresponding storage location of the freed element of the structure is now free, wherein the selected process executing in the data processing circuitry, when a selected storage location is allocated for an element of the data structure, clears a selected bit of the shared free word to indicate that the selected storage location is in use, and wherein the selected process executing in the data processing circuitry is responsive to all bits of the private free word being unset to copy the shared free word to replace the private free word and then clears all bits of the shared free word.

It should be appreciated therefore that the above described techniques for administering the allocation and release of storage locations between multiple processes finds application in the context of the provision of a shared ring buffer where the above-described techniques using pending update records are employed, but is not limited thereto and embodiments can provide this approach of the administering the allocation and release of storage locations for any data structure shared between multiple processes. This approach minimises the number of atomic operations on shared data that the allocating process needs to perform and avoids the need for conditional atomic read-modify-write operations, which are otherwise often used in such circumstances for managing a free list of objects. In the best case scenario only one atomic exchange for every N allocations is required, where N is the number of elements in the free word. The releasing (freeing) operation still require one atomic operation per element, but these can be delayed (when the system allows for that) and thus avoids risking stalling the process. Furthermore the allocation of elements in the array is enabled with little overhead and concerns only process-private data.

Some particular embodiments are now described with reference to the figures.

FIG. 1 schematically illustrates a data processing apparatus 10 in one embodiment. The data processing apparatus 10 comprises a first core 12 and a second core 14. Each of these cores are provided with their own private L1 cache namely caches 16 and 18 respectively. A level 2 cache 20 is shared and leads to the memory 22. Not only is the data processing apparatus 10 a multi-core system, it is also a multi-threaded system, this being illustrated in FIG. 1 by the representations of threads T0 24 and T1 26 executing on core 12, and threads T2 28 and T3 30 on core 14. In a manner with which one of ordinary skill in the art will be familiar, a given thread executing in a given processor core performs data processing operations on data retrieved from the memory 22, temporary copies of data items retrieved from the memory 22 being cached in the cache hierarchy formed by the relevant intervening cache levels. Some data structures of particular relevance to some embodiments of the present techniques are schematically illustrated in memory 22 of FIG. 1, namely the ring buffer storage 32, the base record storage 34, the pending update record storage 36, the shared word storage 38, and the free word storage 40. The present techniques will be explained further with reference to these data structures in the figures which follow.

Figure 2:
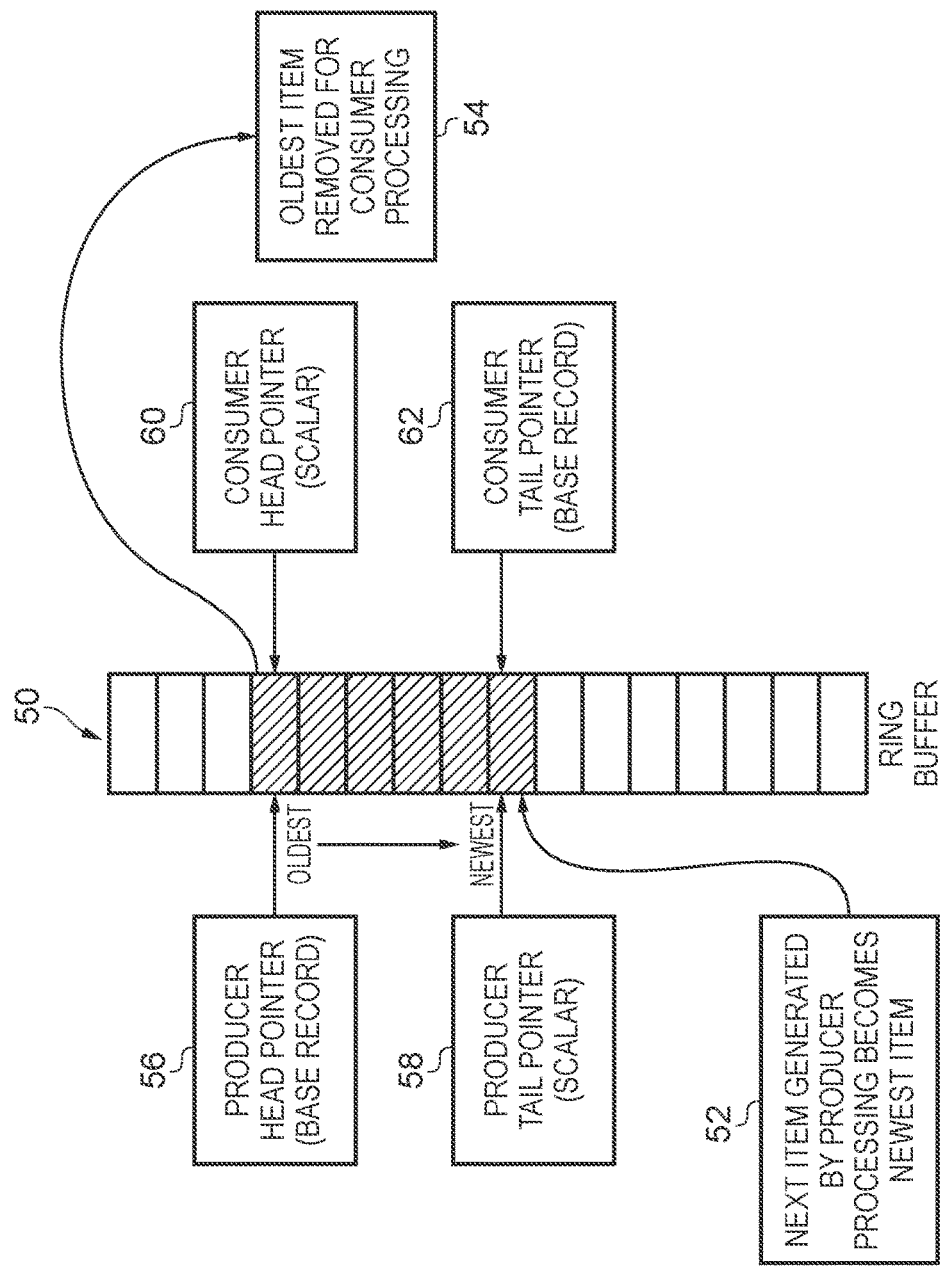
FIG. 2 schematically illustrates a ring buffer and the addition and removal of data items from that ring buffer by producers and consumers with reference to head and tail pointers in one embodiment.

FIG. 2 schematically represents a ring buffer 50. This ring buffer 50 stored in the ring buffer storage 32 of the memory 22 shown in FIG. 1 is used by the processes executing on the cores 12 and 14 to coordinate the processing of particular data items. Generally the use of the ring buffer can be viewed from two aspects, firstly those of one or more "producers" in the system which generate data items that are stored in the ring buffer 50, and secondly those of the "consumers" which remove data items from the ring buffer 50 for further data processing. A key feature of the ring buffer is that it is arranged to be used such that data items held in the ring buffer are in a queued (ordered) sequence, such that the order in which data items are generated by producers is also the order in which they are consumed by consumers. The general principle according to which this is effected is that a next data item generated by a producer (see item 52 in FIG. 2) is enqueued at a "tail" of the stored sequence, whilst the oldest data item still in the sequence is dequeued from its head end for consumer processing (see item 54 in FIG. 2). In other words, the data item at the head of the queued sequence is the oldest data item and the data item at the tail of the queued sequence is the newest data item. For the purpose of keeping track of the current status of valid data items in the ring buffer the system stores four pointers, two on the producer side and two on the consumer side. A producer head pointer 56 indicates the head of the queued sequence, whilst a producer tail pointer 58 indicates the tail of the queued sequence for producers in the system. Similarly, a consumer head pointer 60 indicates the head of the queued sequence and a consumer tail pointer 62 indicates the tail of the queued sequence for consumers in the system. A significant point to note in the present context is that as shown in FIG. 2 the producer head pointer 56 and the consumer tail pointer 62 are provided by data structures which are referred to herein as base records (to be explained in more detail with reference to the figures that follow), whilst the producer tail pointer 58 and the consumer head pointer 60 are simple scalar values.

Figure 3:
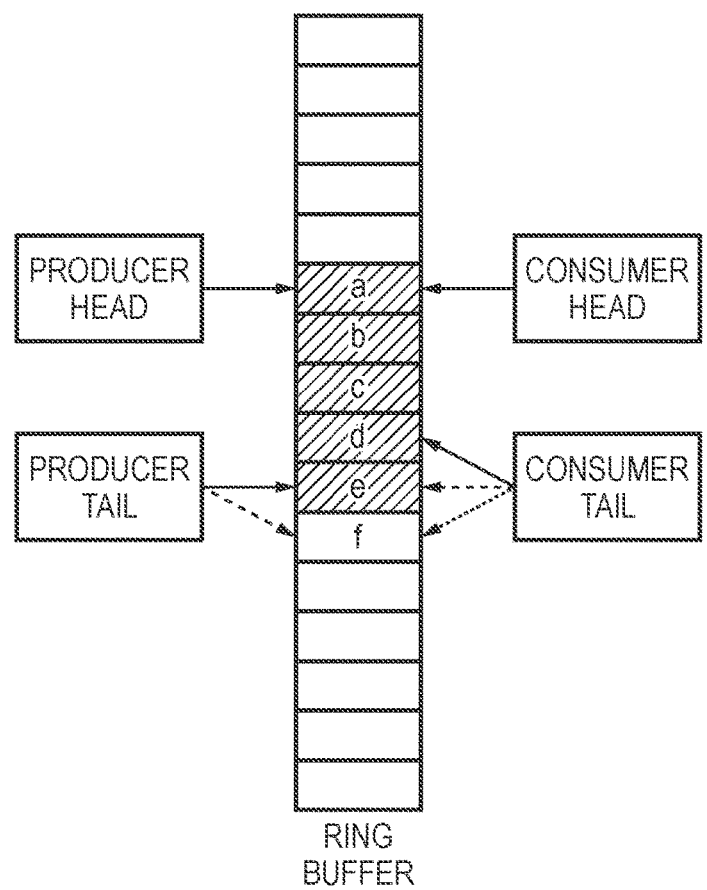
FIG. 3 schematically illustrates how a producer may be being blocked from releasing its updates, because a previous producer hasn't yet completed the release of its updates.

Referring now to FIG. 3, some of the above mentioned difficulties that may arise with respect to the coordinated use of a ring buffer in a data processing system where multiple processes make use of the ring buffer, and in particular where multiple producers and consumers are involved, are now discussed. Generally there is a 3-step enqueuing and dequeuing operation which makes use of the ring buffer. Firstly, a slot (or slots) in the ring is acquired, secondly elements are read from or written to the acquired ring slot(s), and thirdly the updates are released. This is a relatively simple process in a system with only a single producer and a single consumer, in that situation being naturally lock-free. However, in the case of a system comprising multiple producers and multiple consumers the enqueuing and dequeuing requires synchronisation between the producers (consumers). In particular, updates must be released in their order of acquisition (noting that the term "update" covers both reads and writes). It is important that read updates are released in order so that content does not get overwritten before it should be read. Therefore a producer or consumer could have to wait for an earlier producer or consumer to finish doing this. FIG. 3 schematically illustrates one scenario in which this interdependency can manifest itself. In the system making use of the ring buffer shown in FIG. 3, there are four pointers defined, namely a producer head, a consumer head, a producer tail, and a consumer tail. Where newly generated data items are added at the tail of the queue, when a producer wishes to enqueue a new data item making use of the ring buffer it writes to the producer tail and the consumer tail. Conversely, when a consumer wishes to dequeue an item it must update the consumer head and the producer head. Accordingly, in the illustrated situation where slots a, b, c, d, and e are currently in the active queue and the producer wishes to acquire slot f, this acquisition is possible, but when the producer seeks to update the tail pointers to indicate data item f this cannot yet happen on the consumer side, i.e. specifically with respect to the consumer tail, which currently still points to data item d. Whilst the current producer has already updated the producer tail to f as part of the acquisition step, it has to wait for consumer tail have the old value of producer tail, i.e. f.

Figure 4A:
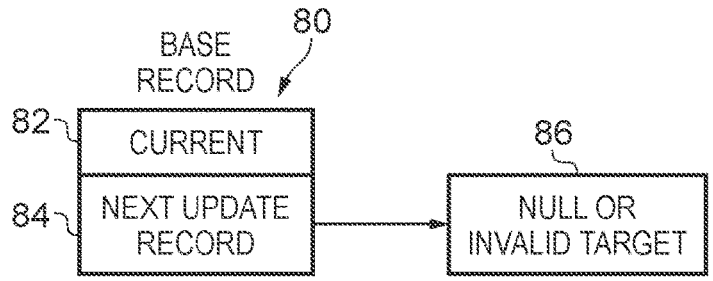
FIG. 4A illustrates a base record of the present techniques in one embodiment.
Figure 4B:
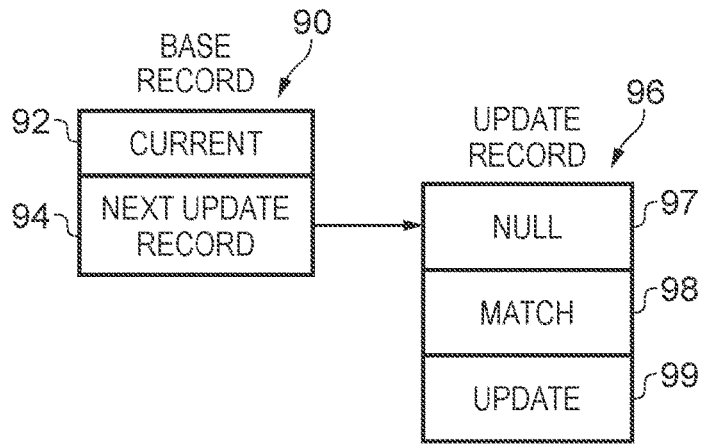
FIG. 4B illustrates a base record and an update record of the present techniques in one embodiment.
Figure 4C:
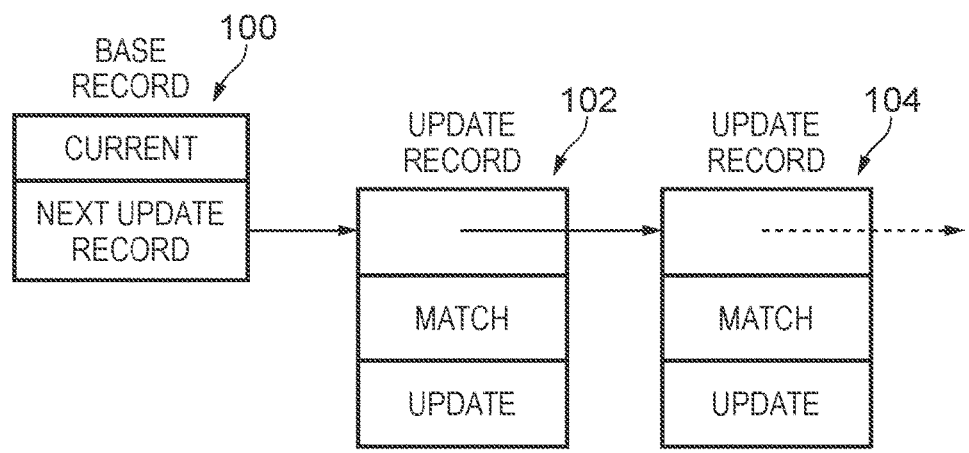
FIG. 4C illustrates a base record and a linked list of update records of the present techniques in one embodiment.

The present techniques address this issue by an approach using delegation, in which producers or consumers with out-of-order updates delegate (i.e. defer) the release of these updates to the in-order producer or consumer. This therefore means that the above-described waiting for an earlier producer or consumer to complete a release does not happen. Some of the data structures provided by the present techniques to support this approach are now described with reference to FIGS. 4A, 4B, and 4C. FIG. 4A schematically illustrates a data structure 80 which is also referred to herein as a base record. This base record comprises two parts, namely a "current" indicator 82 and a "next update record" 84. The "current" indication 82 is used to indicate a particular slot in the ring buffer, and noting that FIG. 2 indicates that the producer head pointer 56 and the consumer tail pointer 62 are base records in the examples shown, it will be understood that the base record 80 shown in FIG. 4A may for example be used as a head or tail pointer to indicate respective slots in the ring buffer. The base record 80 also comprises the "next update record" 84, which in essence is a pointer to another data structure. However, there is no need for the base record to always point to another valid data structure and the example of FIG. 4A reflects this, where the pointer stored in the next update record 84 of the base record 80 points to the invalid target 86. Moreover, as shown in the figure, this next update record 84 pointer could in fact simply be a null pointer. Nevertheless, the next update record pointer can be used to point to another valid data structure and this is illustrated in FIGS. 4B and 4C. Beginning with FIG. 4B, the base record 90 comprises a current indication 92 and the next update record pointer 94. In this example, the next update record pointer 94 points to a different data structure, namely the "update record" 96. An "update record" is therefore another data structure provided by the present techniques. The update record comprises three parts, namely the pointer section 97, the "match" section 98, and the update section 99. The pointer section 97, as its name implies, is provided such that this update record can itself point to a further update record. However, as the example of FIG. 4B shows, this need not be the case and there may be a null pointer (or a pointer to a known invalid target) stored therein. The "match" value 98 indicates a slot in the ring buffer to which this pending update applies, and the update itself is provided by the update section 99. It should be noted that the update section 99 may in fact itself also be a pointer such that the data structure 96 remains relatively small, but equally it is also possible for a small update (e.g. a scalar value) to be explicitly stored within the update record 96. FIG. 4C shows an example where an update record points to another update record, thus forming a linked list of update records. The structure begins with a base record 100 which points to a first update record 102, which itself then points to a further update record 104. It will therefore be understood that a linked list of arbitrary length can thus be constructed by the concatenation of such update records (as the dashed arrow to the right of FIG. 4C indicates).

Figure 5:
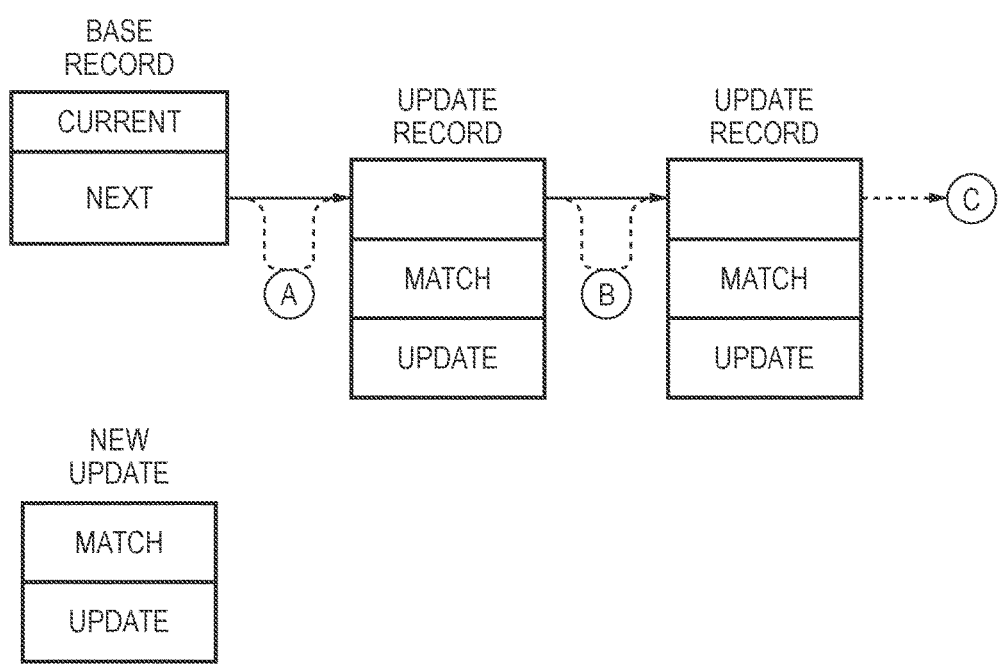
FIG. 5 illustrates three possibilities for merging a new update into an existing linked list of update records of the present techniques in respective embodiments.

FIG. 5 schematically illustrates that a new update to be added to an existing linked list of update records could in principle be added at various positions within that linked list. There are generally three possibilities. The first ("A") is for the new update to be positioned between the base record and the first update record. The second possibility ("B") is for the new update to be introduced at some point within the linked list between two pre-existing update records. The third possibility ("C") is for the new update record to be added at the far end of the linked list, such that the last update record of the pre-existing linked list then points to the new update record generated on the basis of the new pending update.

Figure 6A:
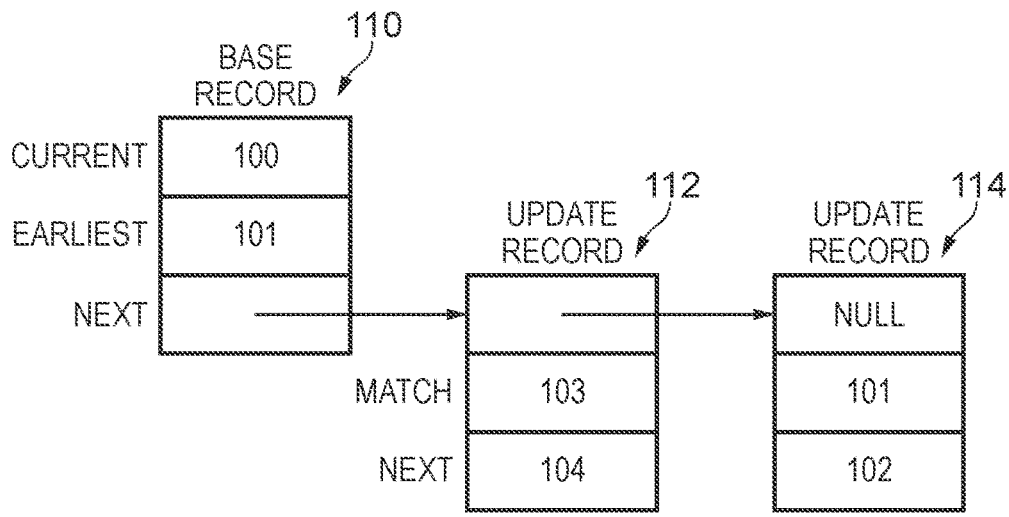
FIG. 6A illustrates an example base record and linked list of two update records of the present techniques in one embodiment.

FIGS. 6 and 7 now provide some examples of how the base record, update records, and linked lists of the present techniques may be used. Turning first to the example of FIG. 6A, an example is given where a (simple) pre-existing linked list of one base record and two update records are present. Note also that in this example the base record comprises an additional component, namely the "earliest" indicator, which is used to record the earliest pending update record which forms part of the linked list. Here, "earliest" is to be understood as the "match" value (corresponding to a slot in the ring buffer) which is the first update within the linked list which must be processed, when the updates are released in order. Accordingly, looking at FIG. 6A, the base record indicates a "current" value of 100 (e.g. this could indicate that the head pointer points to slot 100 in the ring buffer where this base record is used for the producer head pointer 56). The "next" pointer of the base record 110 points to the update record 112. The update record 112 has a match value of 103, indicating that this update is to be applied to the slot 103 in the ring buffer (and therefore must wait until the intervening slots between the current slot 100 and its target slot 103 have been released before this update itself can be released. The update record 112 points to a further update record 114, which has a match value of 101. As such 101 is the "earliest" update in the linked list, and hence this is the value recorded in the base record 110. Note that both update records 112 and 114 also store their respective updates, namely the position to which the pointer should be moved, respectively 104 and 102, when these updates are released.

Figure 6B:
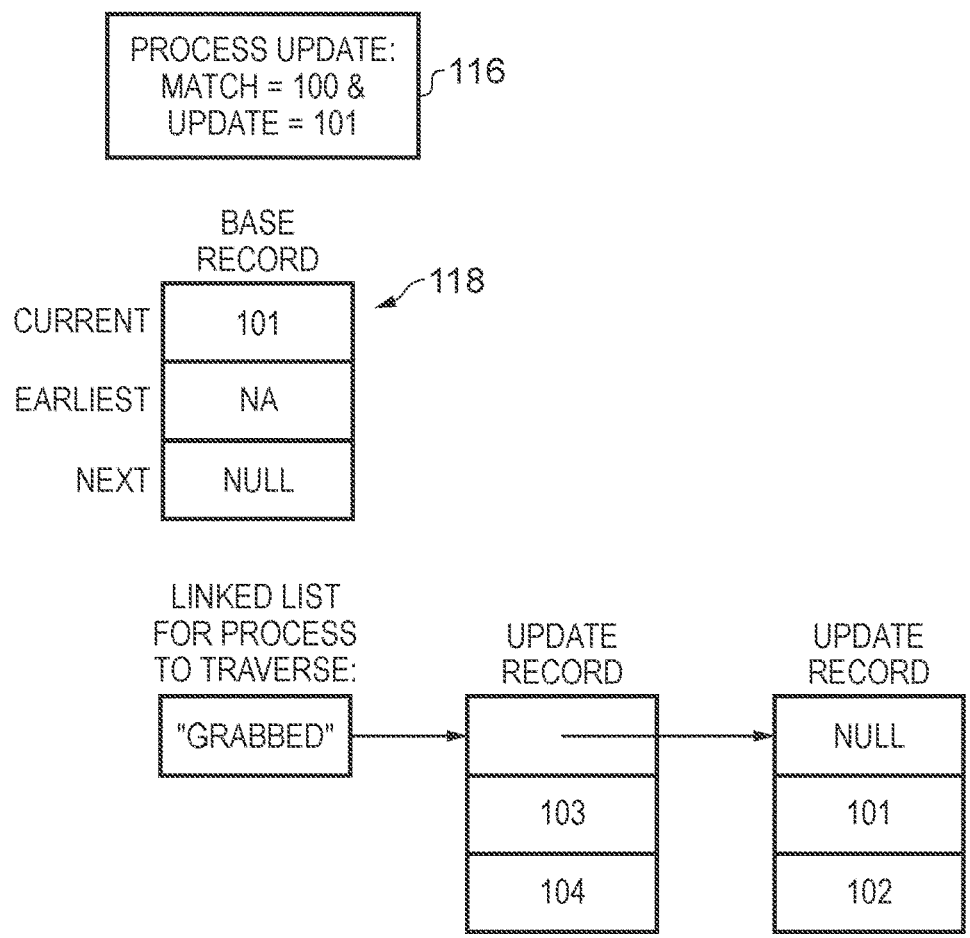
FIG. 6B illustrates the processing of the base record and update record of FIG. 6A when a new update is processed, resulting in the linked list being "grabbed" for separate "non critical path" processing.

Turning then to FIG. 6B an incoming update 116 is shown, which is to be applied to slot 100 and to update the pointer to slot 101. FIG. 6B thus first illustrates an intermediate state 118 of the base record in which the current value has been updated to the new value of 101, but in which, at this stage, the earliest value is not available (NA) and the next pointer is currently null. As well as updating the base record to this temporary state, the linked list is also "grabbed" for processing, by the actor in the system (e.g. thread) which has applied the update 116. Note in particular that it is the updating of the base record which represents the "critical section", i.e. that which must necessarily briefly block other actors, but (as will be explained in further detail below) this update involves limited processing and therefore does not represent a significant constraint on throughput when multiple actors are involved. The "grabbed" linked list shown at the foot of FIG. 6B can then be processed outside of this critical section.

Figure 7A:
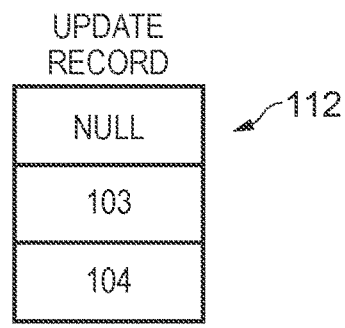
FIG. 7A illustrates an update record and two pointers which result from the processing of the "grabbed" linked list of FIG. 6B.

Following the release by this process of the update held by update record 114 (see FIG. 6A) this leaves the update record 112, which cannot yet be released because its match value is 103 and following the update of applying the update record 114 the current value held in the base record is 101. FIG. 7A shows this out-of-order pending update for the process which grabbed the linked list and released the update record 114. This process thus needs to return this remaining update record 112 to the linked list of out-of-order updates beginning with the base record.

Figure 7B:
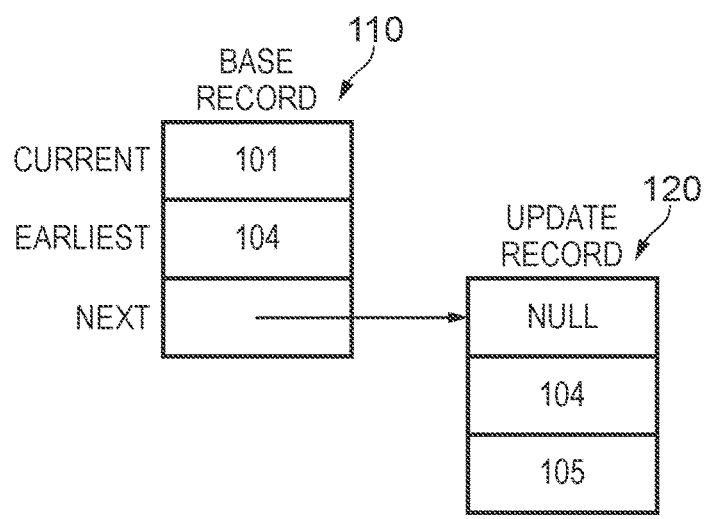
FIG. 7B illustrates a base record and update record which are found after the processing of the "grabbed" linked list of FIG. 6B.
Figure 7C:
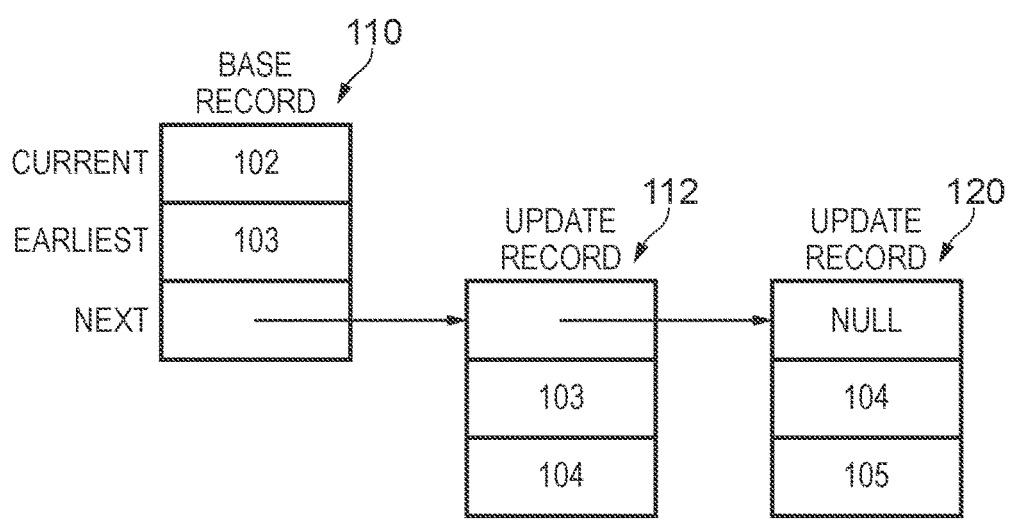
FIG. 7C illustrates a base record and linked list of two update records of the present techniques which result from the merging of the update record of FIG. 7A with the base record and update record of FIG. 7B.

However, FIG. 7B illustrates a further circumstance which may occur, namely that whilst this process (in FIGS. 6B and 7A) was processing the grabbed linked list another process has stored a pending update record and linked this to the base record. Hence, as can be seen in FIG. 7B, the base record now indicates a "current" value of 101 and "earliest" has been updated to 104. The further, linked update record is update record 120 in FIG. 7B. This has been linked to the base record 110, in that the base record 110 now points to this update record 120. Accordingly, in order for the first process to merge the update record 112 into the linked list, the first process must again modify the base record 110. The result of this further section of "critical section" processing is shown in FIG. 7C, where it can be seen that the update record 112 has been introduced into the linked list by modifying the "next" pointer of the base record 110 to point to this update record 112, and the pointer of the update record 112 has been modified to point to the update record 120.

Figure 8:
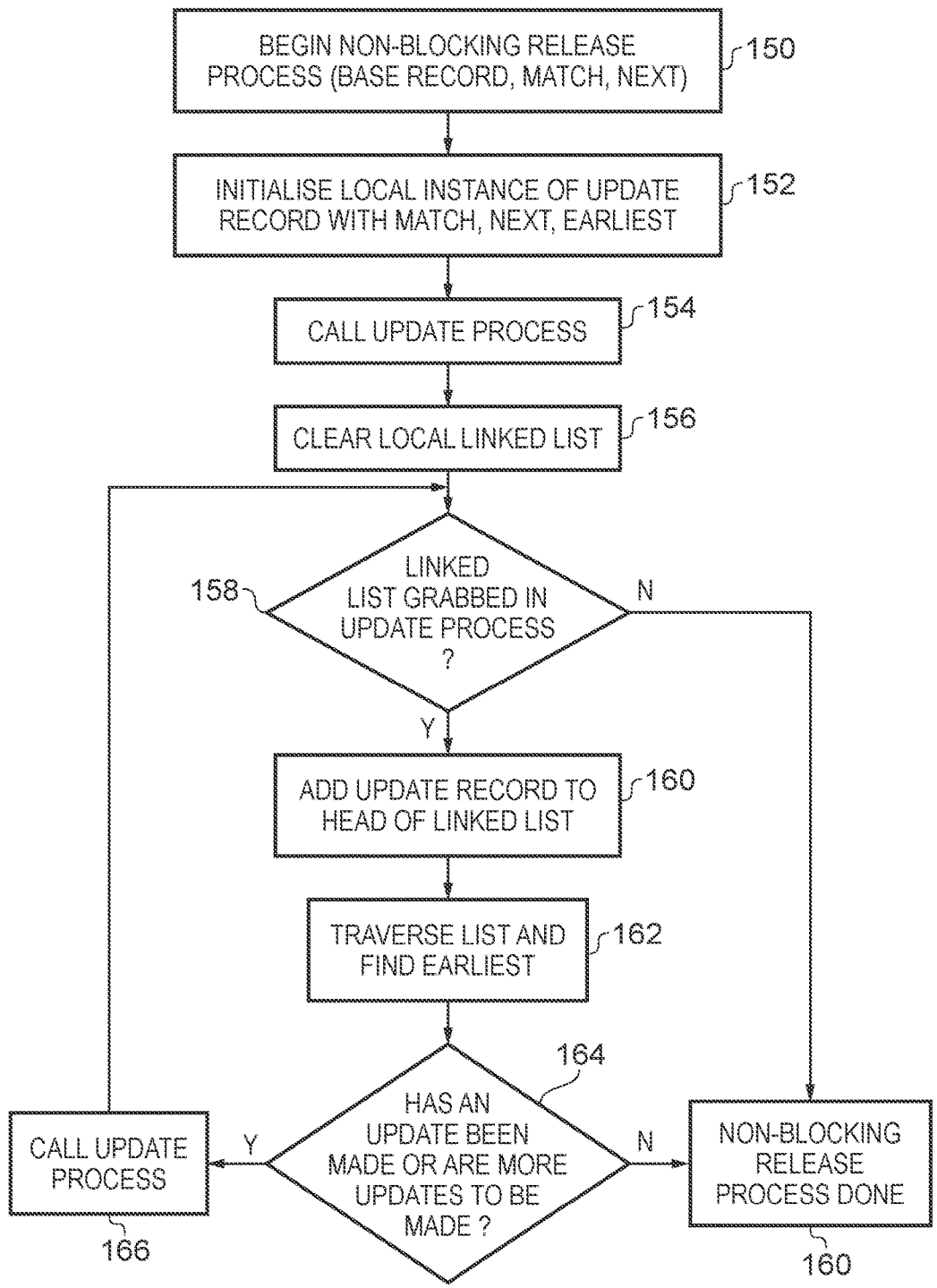
FIG. 8 shows a sequence of steps which are taken in the method of one embodiment when a system component performs a non-blocking release of an update to be made to the ring buffer.

Example steps which are taken in the process of carrying out the "non-blocking" release process of the present techniques are shown in FIG. 8. The process begins at step 150 where a process in the system wishes to release an update related to the ring buffer. This update comprises a base record to seek to modify, a match value (which "current" must be for the update to be applied), and a next value to which "current" should be updated. Next at step 152 a local instance of an update record is initialised. Then at step 154 the update process (to be described in more detail below with a respect to FIG. 9) is called. This is the "critical section". Then at step 156 any local linked list is cleared and at step 158 it is determined if a linked list has been grabbed as a result of the update process for local processing. If it has not then the flow simply proceeds to step 160 where this non-blocking release process is complete. However, when a linked list has been grabbed, then the flow proceeds to step 160, where in a local linked list the new update record to be released is added to the head of that existing linked list. The linked list is then traversed at step 162 to determine the earliest update it contains, such that the earliest value of the base record can be modified to reflect this. It should be noted that the traversal of a grabbed list of updates potentially updates the base record. The grabbed link list is repeatedly traversed, looking for matches that can update the "current" value of the base record. If a match is found, the corresponding update record is unlinked (and freed) and traversal restarts (because now there is a new value of current to match). When no more matches can be made, it is attempted to write back the updated base record (current, earliest, next) (see step 166 described below). At step 164 it is determined if an update has been made (by another process) whilst this local processing was going on, or equally if there are further updates to be made. When this is the case, the flow proceeds to step 166 where the update process is called again and thereafter the flow returns to step 158. If, however, at step 164 it is determined that no such update has been made whilst this local processing has been going on and that there are no further updates to be made, then the flow proceeds to step 160 where the non-blocking release process is complete.

Figure 9:
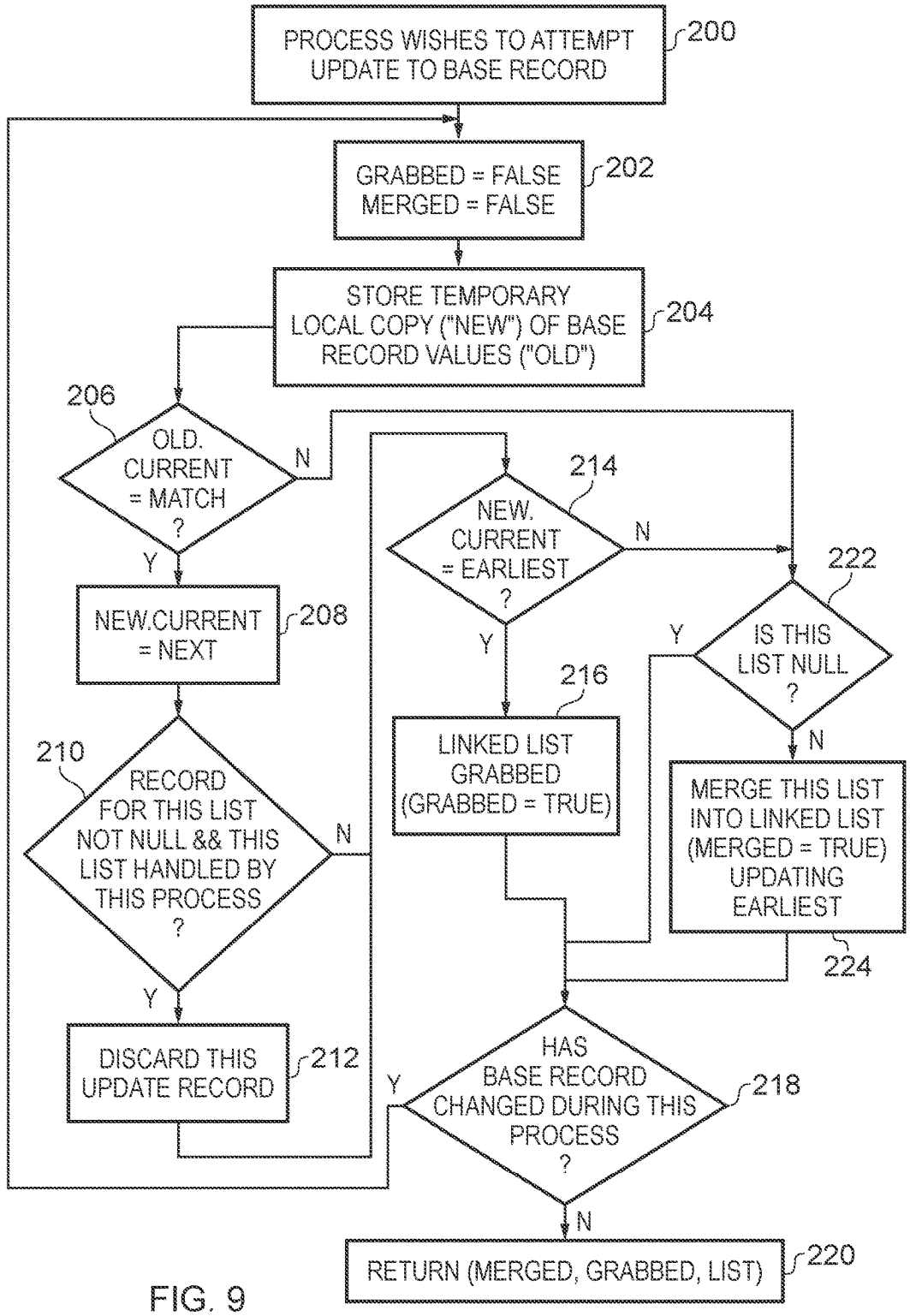
FIG. 9 shows a sequence of steps which are taken when a system component seeks to update a base record of the present techniques.

FIG. 9 shows a sequence of steps which are taken in one embodiment when carrying out the update process, specifically (as the first step 200 shows) when a process wishes to attempt to make an update to the base record. Firstly at step 202 the variables "GRABBED" and "MERGED" are set to be false. Then at step 204 a temporary local copy (labelled "NEW") of the current base record values ("OLD") is made. The flow then proceeds to step 206, where it is determined if the "current" value of OLD matches that of the update, i.e. if this is an in-order update which can be immediately processed. If this is the case then the flow continues to step 208, where the "current" value of NEW is updated to that indicated by the update (i.e. the update's "next" value). Then at step 210 it is determined if the record for the list is not null and if this list is being handled by this process. If this is the case, then this (local) update record is discarded at step 212, but otherwise the flow proceeds directly to step 214.

At step 214 it is then determined if the "current" value of NEW now matches the "earliest" value, i.e. if the base record indicates that the next in-order update which can be processed will be found within the linked list. If this is true then the flow proceeds to step 216, where the linked list is "grabbed" by the process (for local processing outside this critical section) and the variable GRABBED is set to be true. It is then determined at step 218 if the base record has been changed during whilst this process was being carried out (i.e. if the base record now doesn't match OLD). If it has, then the flow returns to step 202. Otherwise the base record is atomically updated e.g. using a compare-and-swap (CAS) operation and the update process concludes at step 220, where the variables MERGED and GRABBED are returned (to indicate what the process has done), together with a grabbed list if applicable (i.e. the flow passed via step 216 and the linked list was "grabbed" by the process for local processing outside the critical section). Returning now to step 214, if it is determined that the "current" value of NEW does not match the "earliest" value (i.e. the next in-order update to be processed is not to be found in the linked list), then the flow proceeds to step 222. At step 222 it is determined if the list is null. If it is, then the flow just proceeds to step 218. Otherwise (if the list is not null) the flow proceeds to step 224, where this list is merged into the linked list (and the MERGED is set to true and the earliest value is updated). The flow then proceeds to step 218. Finally, returning to the consideration of step 206, if it is found there that the "current" value of OLD does not match that of the update, i.e. this an out-of-order update which must wait, then the flow proceeds to step 222.

Figure 10:
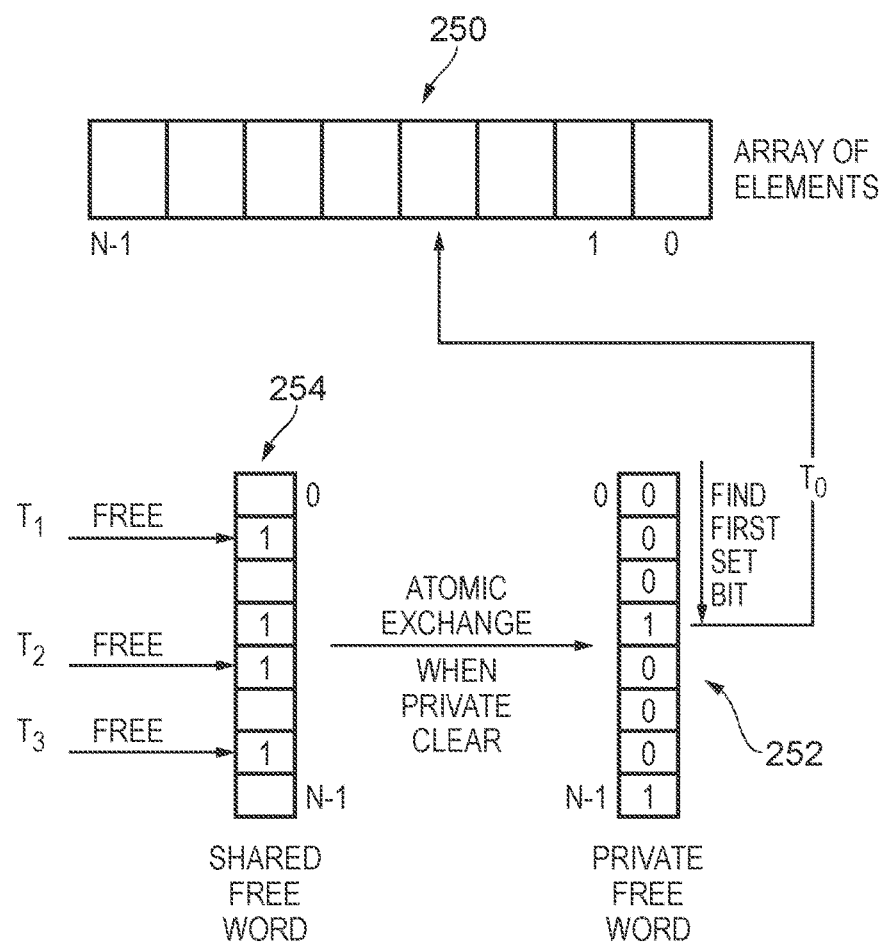
FIG. 10 schematically illustrates a lock-free manner in which elements of an array may be allocated by one thread, but freed by other threads, in the system according to the present techniques.
Figure 11:
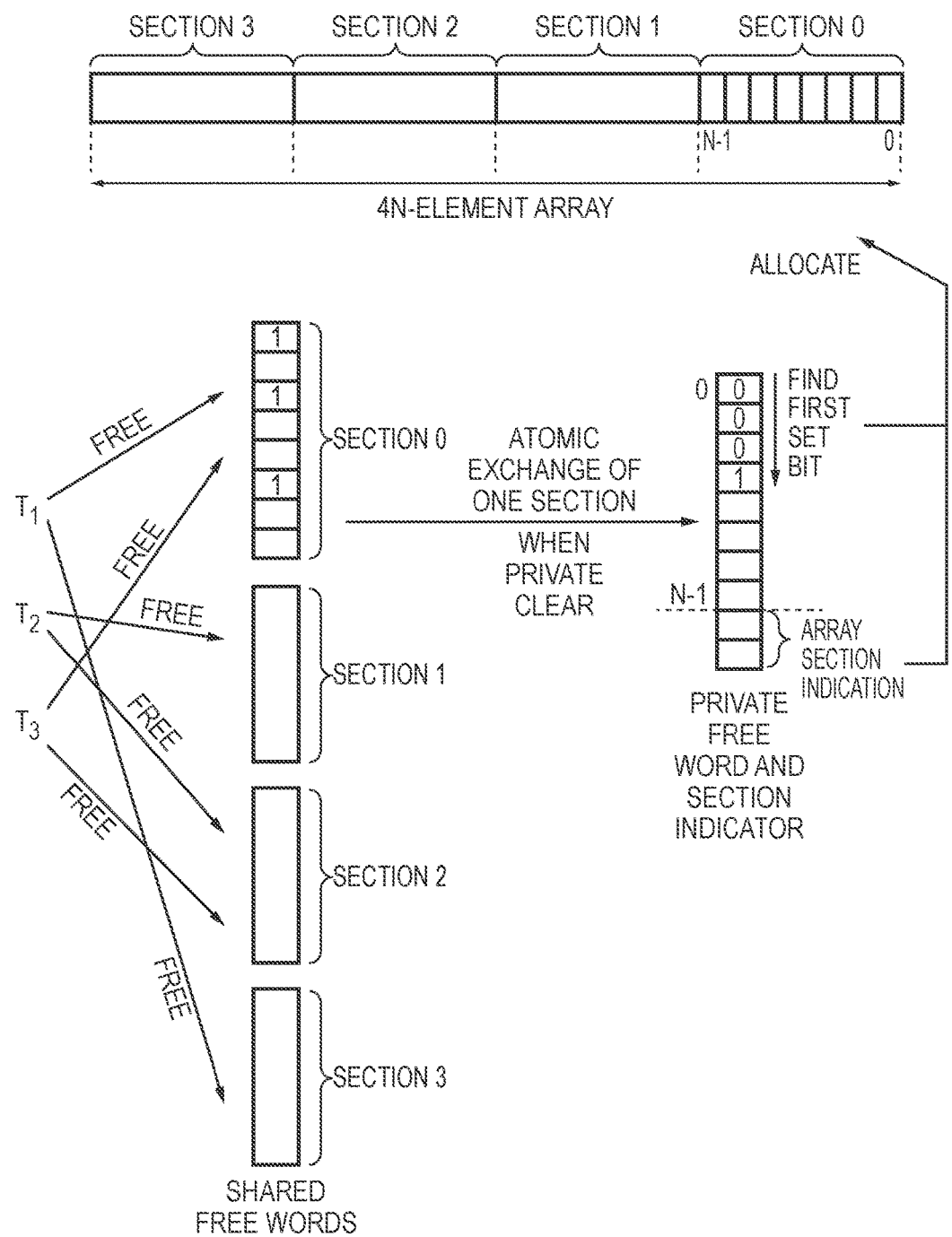
FIG. 11 schematically illustrates a variant on the mechanism shown in FIG. 10 in which multiple shared free words correspond to the elements of the array.
Figure 12:
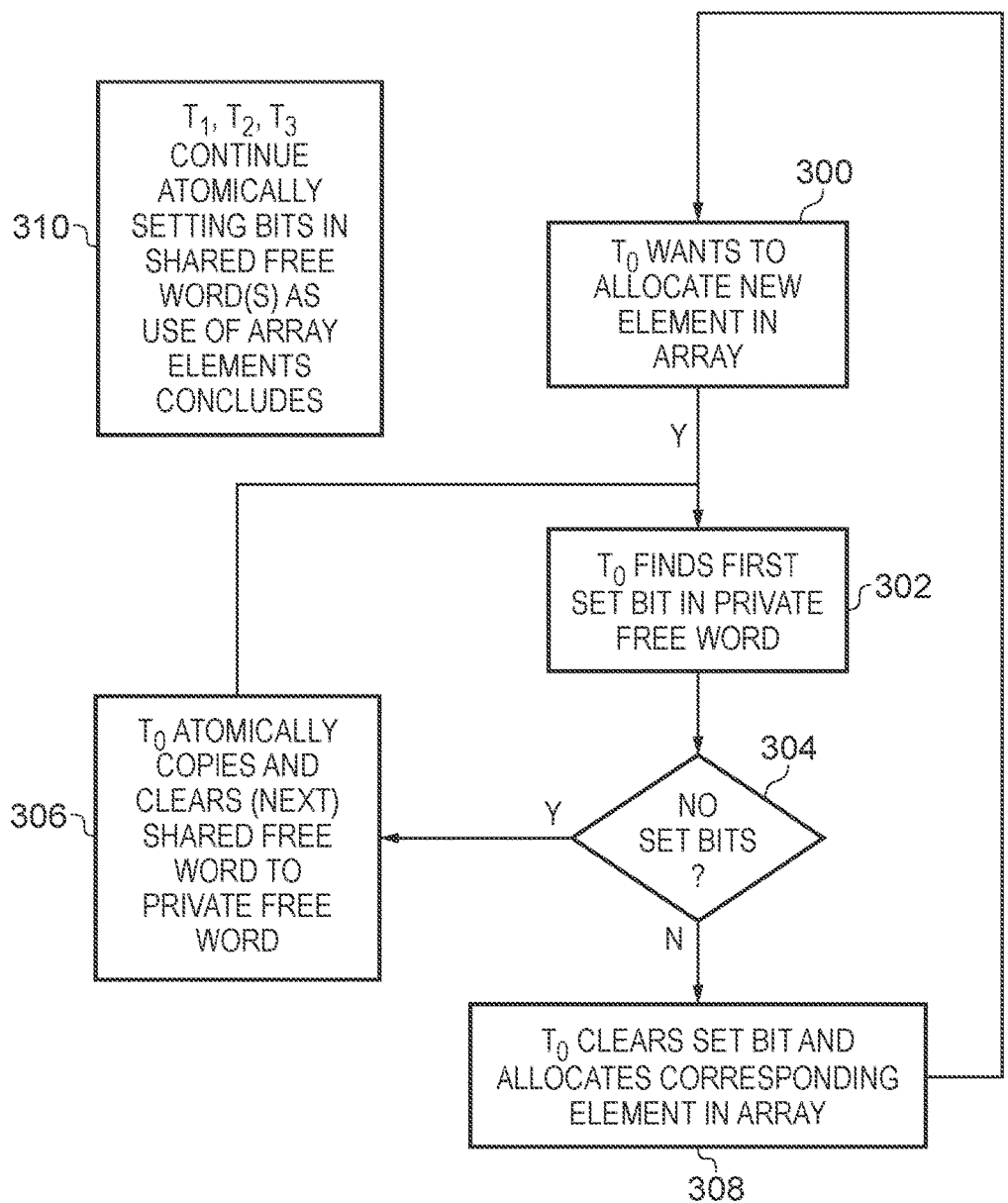
FIG. 12 shows a sequence of steps which are taken in the method of one embodiment which implements the mechanisms shown in FIGS. 10 and 11.

A further aspect of the present techniques is now discussed with respect to FIGS. 10-12. This relates to the manner in which storage locations for the pending update records are administered, where it is recognised that this needs to take place in manner which does not cause conflict and is efficient between the respective threads executing in the system. In particular this represents an approach to minimising the overhead (e.g. cache coherency traffic) and latency, when managing thread-specific resources that are allocated by one thread, but also accessed and subsequently freed by other threads. It should be recognised that this is the case in the present context of the administration of a ring buffer to which multiple threads have access, since the allocation of memory for a given pending update record may be performed by one thread, but released by another. This further supports the above-described delegation of ring buffer updates to support its lock-free manner. The allocation and freeing of these data structures must be very low overhead or the performance of the main lock-free algorithm would be negatively affected. Moreover, it should be recognised that the techniques described with respect to FIGS. 10-12 support the above-described context of a ring buffer, but in fact may apply to any managed data structure to which multiple threads have access and are accessed in an arraystyle. In the example of FIG. 10 the array of elements 250 is represented and the elements correspond to storage locations for pending update records. Corresponding to this, two words are defined as shown in the lower part of FIG. 10, namely a private free word 252 and a shared free word 254. It should be noted that this example is shown in terms of a relatively simple "word", but there is no requirement for this to be strictly a word within the definition of the architecture, and the array and the corresponding words can in principle take any range of sizes, and indeed the shared free word and the private free word may each consist of more than one separate word in order to correspond to the array of elements 250. It should, however, be noted that certain operations that will be described are atomic and these can only operate at one specific word at a time.

The shared free word can be accessed by all threads in the system and is used to indicate free elements within the array of elements, i.e. potential storage locations for slots of the ring buffer. An element in the array is freed by atomically setting the corresponding bit in the shared free word 254. Depending on where the shared free word is stored any suitable atomic store operation may be used for this, which preferably minimises the overhead and latency of the operation. Thus, as updates are made to the ring buffer and storage locations become freed, more bits in the shared free word are set. It should be noted that it is necessary to be able to deduce the location of the shared free word and the corresponding bit from the element in the array, such that when the element in the array becomes free the thread which is processing this element is able to set the corresponding bit in the shared free word. This constraint may be addressed in various ways, but in one approach the address of the shared free word and the bit are stored explicitly in the element itself. It could for example be a dependency between the array of elements and the shared free word (e.g. that they are stored at adjacent memory locations) and this may allow less information to be stored in each element.

The private free word 252 is specific to the thread that owns the managed data structure, i.e. the array of elements (e.g. corresponding to pending update records), and when this thread (T0 in this example) needs to allocate an element it accesses the private free word to find an element where the bit is set, this indicating that the corresponding element in the array of elements may be allocated. Finding this set bit may for example be performed using a "find first bit set" operation. This bit is then cleared (noting that this can be done immediately or can be deferred). If however the private free word is zero (i.e. no bits are set), then the private status needs updating from the shared status and the shared free word is atomically copied into the private free word and the shared free word is then set to zero. Note that this is essentially an atomic exchange operation, i.e. return old value and set the location to a new value (zero). For example, an atomic swap operation might be used for this. Further, as previously mentioned, it should be appreciated that this technique has been presented above with respect to FIG. 10 using an example with "shared free word(s)" and a "private free word", in which bits are set to indicate available ("free") storage locations, but the same technique could equally be embodied in an example using "shared used word(s)" and a "private used word", in which bits are set to indicate unavailable ("used") storage locations. Equally even the choice of the meaning of a "set" bit will be recognised to be arbitrary, where this could be trivially inverted without changing the underlying technique FIG. 11 schematically illustrates a variant on the example shown in FIG. 10, in which the managed array of elements is sub-divided into multiple sections (four in this example) and there are correspondingly four shared free words in which the threads set bits to indicate that the corresponding element has been released. However, note that there is only a single private free word. Nevertheless this private free word is extended by an array section indicator which in this example is two further bits enabling an indication of one of the four sections to be made. The manner in which the shared free words and the private free word is the same as that in FIG. 10, except that the transfer of content from the shared free words to the private free word takes place in rotation through the four sections and correspondingly the four sections of the managed array are used in this rotating round robin fashion. In other words, when it is found that there are no set bits in the portion of the private free word which corresponds to a section of the array, a transfer is made from a next section of the shared free words. Thus, bits may continually be updated (i.e. set) in all four sections of the shared free words, such that by the time the private free word needs updating from a given section, more time has been allowed for this section to be populated with freed elements.

A sequence of steps which are taken when administering the shared free word, the private free word, and the array of elements in one embodiment is shown in FIG. 12. The flow may be considered to begin at step 300 where the thread which owns the array wishes to allocate a new element. The flow then proceeds to step 302, where this thread attempts to find the first set bit in the private free word. If however it is determined at step 304 that the private free word has no set bits, then the flow proceeds to step 306. However, when there is a set bit within the private free word, from step 304 the flow proceeds to step 308, where the thread clears that set bit and allocates the corresponding element in the array and the flow returns to step 300. Returning to a consideration of step 306 (when the private free word was zero) the thread atomically copies and clears the shared free word to the private free word. The variant in parentheses ("next") indicates that in variants using the example of FIG. 11 this could be done by iterating through a number of shared free words. Then at step 302, this thread again attempts to find the first set bit in the private free word. Finally, step 308 shows how (in parallel, not part of the flow) the other threads in the system are continuously atomically setting bits in the shared free word(s) when the use of the array elements concludes and they can be released.

The above-described approach with respect to FIGS. 10-12 minimises the number of atomic operations on shared data that the allocating thread needs to perform and avoids the need for conditional atomic read-modify-write operations, which are otherwise often used in such circumstances for managing a free list of objects. In the best case scenario only one atomic exchange for every N allocations is required, where N is the number of elements in the free word. The freeing operation still require one atomic operation per element but these can be delayed (if the system allows for that) and thus avoids stalling the thread. Furthermore, the allocation of elements in the array is enabled with little overhead and concerns only thread-private data. This means that if it turns out that the allocated element is not needed after all (this might only be determined later, for example in the critical section of the overall lock-free algorithm in which these managed elements are used), the new allocation can be undone without further atomic operations on shared data. Alternatively, the element may only be marked as used in the private free word once it is known that it was actually required. It should be noted that the shared and private free words are preferably located in different cache lines, to avoid conflict. The private word is preferably located together with other thread-private data. The shared word could be located with other data that is subject to atomic operations or in a cache line of its own in dependence on a particular system configuration.

Briefly in conclusion, one example summarised view of the present disclosure is that techniques are provided in which a ring buffer comprises multiple slots for a queued sequence of data items. New data items are sequentially added to the queued sequence and sequentially removed for further processing. A base record comprises a reference indicator, wherein a value of the reference indicator is indicative of a current slot of the multiple slots of the ring buffer. A pending update record is provided comprising a subject slot indicator, an update slot indicator, and a next update pointer for pointing to another pending update record. The base record further comprises a pending update record pointer. When there is an update to be applied to the value of the reference indicator of the base record, but the update is out-of-order, i.e. references a different slot to the current slot, a new pending update record is generated indicative of the update. Techniques for allocating and releasing elements in an array shared by multiple threads are also disclosed.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
ring buffer storage circuitry for storage of a ring buffer comprising multiple slots for a queued sequence of data items;
data processing circuitry to sequentially add data items to be processed to the queued sequence and to sequentially remove data items for processing from the queued sequence;
base record storage for storage of a base record comprising a reference indicator, wherein a value of the reference indicator is indicative of a current slot of the multiple slots of the ring buffer; and
pending update record storage for storage of at least one pending update record, wherein a pending update record comprises: a subject slot indicator, an update slot indicator, and a next update pointer item for storage of a pointer to another pending update record,
wherein the base record further comprises a next record pointer item for storage of a pending update record pointer,
and wherein, when a currently active process in the data processing circuitry has an update to be applied to the value of the reference indicator of the base record, the currently active process in the data processing circuitry is responsive to an out-of-order condition, in which the update references a different slot to the current slot, to generate a new pending update record indicative of the update.

2. The apparatus as claimed in claim 1, wherein the currently active process in the data processing circuitry is further responsive to the out-of-order condition, when the next record pointer item of the base record does not point to a valid pending update record, to update the next record pointer item of the base record to point to the new pending update record.

3. The apparatus as claimed in claim 2, wherein the currently active process in the data processing circuitry is further responsive to the out-of-order condition, when the next record pointer item of the base record comprises a null pointer, to update the next record pointer item of the base record to point to the new pending update record.

4. The apparatus as claimed in claim 1, wherein the currently active process in the data processing circuitry is further responsive to the out-of-order condition, when the next record pointer item of the base record points to a valid pending update record currently stored in the pending update record storage, to form a linked list of pending update records using the valid pending update record and the new pending update record.

5. The apparatus as claimed in claim 4, wherein forming the linked list of pending update records using the valid pending update record and the new pending update record comprises modifying the next record pointer item of the base record to point to the new pending update record and setting the next update pointer item of the new pending update record to point to the valid pending update record.

6. The apparatus as claimed in claim 4, wherein forming the linked list of pending update records using the valid pending update record and the new pending update record comprises modifying the next record pointer item of the valid pending update record to point to the new pending update record.

7. The apparatus as claimed in claim 4, wherein forming the linked list of pending update records using the valid pending update record and the new pending update record comprises modifying an existing linked list of pending update records which comprises the valid pending update record to further comprise the new pending update record.

8. The apparatus as claimed in claim 1, wherein the base record further comprises an earliest slot indicator item for storage of a value indicating an earliest subject slot indicator value in any valid pending update record currently stored in the pending update record storage.

9. The apparatus as claimed in claim 8, wherein, when the currently active process in the data processing circuitry has the update to be applied to the value of the reference indicator of the base record, the currently active process in the data processing circuitry is responsive to an in-order condition, in which the update references the current slot, to apply the update to the value of the reference indicator of the base record, and to determine if an available further update condition is met in which the earliest subject slot indicator value in the earliest slot indicator item is a next sequential slot after the current slot, and when the available further update condition is met to process at least one valid pending update record currently stored in the pending update record storage to retrieve and apply an available further update.

10. The apparatus as claimed in claim 8, wherein the currently active process in the data processing circuitry is further responsive to the out-of-order condition, when the next record pointer item of the base record points to a valid pending update record currently stored in the pending update record storage, to form a linked list of pending update records using the valid pending update record and the new pending update record and to store the subject slot indicator of the new pending update record in the earliest slot indicator item when the subject slot indicator of the new pending update is now the earliest subject slot indicator value in any valid pending update record in the linked list of pending update records.

11. The apparatus as claimed in claim 1, wherein, when the currently active process in the data processing circuitry has the update to be applied to the value of the reference indicator of the base record, the currently active process in the data processing circuitry is responsive to an in-order condition, in which the update references the current slot, to apply the update to the value of the reference indicator of the base record.

12. The apparatus as claimed in claim 11, wherein the currently active process in the data processing circuitry is further responsive to the in-order condition to process at least one pending update record to which the next update pointer item leads, and, when the in-order condition is found again whereby the subject slot indicator of one of the at least one pending update records indicates the current slot after update, to apply the update of said one of the at least one pending update records to the value of the reference indicator of the base record.

13. The apparatus as claimed in claim 1, wherein the base record comprises a head pointer used to indicate a first data item in the queued sequence of data items by processes executing in the data processing circuitry to sequentially add data items to be processed to the queued sequence.

14. The apparatus as claimed in claim 1, wherein the base record comprises a tail pointer used to indicate a last data item in the queued sequence of data items by processes executing in data processing circuitry to sequentially remove items for processing from the queued sequence.

15. The apparatus as claimed in claim 1, wherein the currently active process in the data processing circuitry is responsive to a conclusion of a processing procedure on the base record and, when required, on the at least one pending update record, to determine whether a modification to the base record or, when processed, to the at least one pending update record, has been made by another active process during the processing procedure, and when the modification has occurred to repeat the processing procedure.

16. The apparatus as claimed in claim 1, further comprising:
 shared free word storage to store one or more shared free words comprising multiple bits corresponding to an array of pending update records, wherein multiple processes executing in the data processing circuitry are permitted to modify the one or more shared free words; and
 private free word storage to store a private free word comprising multiple bits, wherein only a selected process executing in the data processing circuitry is permitted to modify the private free word,
 wherein each of the multiple processes executing in the data processing circuitry, when freeing a completed update record, further atomically sets a selected bit of the one or more shared free words to indicate that a corresponding storage location of the completed update record is now free,
 wherein the selected process executing in the data processing circuitry, when seeking to allocate a new pending update record, further selects a selected storage location to allocate for the new pending update record for which a corresponding bit of the private free word is set and clears the corresponding bit to indicate that the selected storage location is now in use, and
 wherein the selected process executing in the data processing circuitry is responsive to all bits of the private free word being unset to atomically copy a selected shared free word of the one or more shared free words to replace the private free word and to unset all bits of the selected shared free word.

17. The apparatus as claimed in claim 16, wherein:
 the shared free word storage stores one shared free word, the one shared free word comprising multiple bits corresponding to the array of pending update records,
 and wherein the selected process executing in the data processing circuitry is responsive to all bits of the private free word being unset to atomically copy the one shared free word as the selected shared free word to replace the private free word.

18. The apparatus as claimed in claim 16, wherein:
 the shared free word storage stores plural shared free words, the plural shared free words together comprising multiple bits corresponding to one or more arrays of pending update records,
 and wherein the selected process executing in the data processing circuitry is responsive to all bits of the private free word being unset to atomically copy one of the plural shared free words as the selected shared free word to replace the private free word.

19. The apparatus as claimed in claim 18, wherein the plural shared free words are together an integer multiple factor longer than the private free word and the private free word storage further comprises storage for a section indicator, wherein the section indicator holds a section value of up to the integer multiple factor,
 and the selected process executing in the data processing circuitry is responsive to the section value to select the selected storage location to allocate for the new pending update record in a corresponding section of the pending update record storage,
 and the selected process executing in the data processing circuitry is responsive to the section value to select the selected shared free word corresponding to the section value.

20. The apparatus as claimed in claim 16, wherein a storage address of the one or more shared free words and an indication of a respective bit of the one or more shared free words corresponding to the new pending update record are also stored in the selected storage location for the new pending update record.

21. The apparatus as claimed in claim 16, wherein the one or more shared free words is stored at a storage address with a predetermined relationship to a storage address of the array of pending update records.

22. The apparatus as claimed in claim 16, wherein the one more shared free words and the private free word are stored in different cache lines in cache storage circuitry of the apparatus.

23. An apparatus comprising:
data storage circuitry to store a data structure comprising multiple elements;
data processing circuitry to host execution of multiple processes to perform data processing operations on data items stored in the multiple elements of the data structure;
shared free word storage to store a shared free word comprising multiple bits corresponding to the multiple elements of the data structure, wherein multiple processes executing in the data processing circuitry are permitted to modify the shared free word; and
private free word storage to store a private free word comprising multiple bits corresponding to the multiple elements of the data structure, wherein only a selected process executing in the data processing circuitry is permitted to modify the private free word,
wherein each of the multiple processes executing in the data processing circuitry, when freeing an element of the data structure, sets a selected bit of the shared free word to indicate that a corresponding storage location of the freed element of the structure is now free,
wherein the selected process executing in the data processing circuitry, when a selected storage location is allocated for an element of the data structure, clears a selected bit of the shared free word to indicate that the selected storage location is in use, and
wherein the selected process executing in the data processing circuitry is responsive to all bits of the private free word being unset to copy the shared free word to replace the private free word and then clears all bits of the shared free word.

24. A method of operating data processing apparatus comprising the steps of:
allocating storage for a ring buffer comprising multiple slots for a queued sequence of data items;
sequentially adding data items to be processed to the queued sequence and sequentially removing data items for processing from the queued sequence;
storing a base record comprising a reference indicator, wherein a value of the reference indicator is indicative of a current slot of the multiple slots of the ring buffer;
storing at least one pending update record, wherein a pending update record comprises: a subject slot indicator, an update slot indicator, and a next update pointer item for storage of a pointer to another pending update record,
wherein the base record further comprises a next record pointer item for storage of a pending update record pointer; and
when a currently active process in the data processing apparatus has an update to be applied to the value of the reference indicator of the base record, the currently active process in the data processing apparatus is responsive to an out-of-order condition, in which the update references a different slot to the current slot, to generate a new pending update record indicative of the update.

* * * * *